(12) United States Patent
Olberg et al.

(10) Patent No.: US 6,191,371 B1
(45) Date of Patent: Feb. 20, 2001

(54) ELECTRONIC FORMULA PROCESSING SCALE

(75) Inventors: Albrecht Olberg, Bovenden; Christian Oldendorf, Goettingen, both of (DE)

(73) Assignee: Sartorius Aktiengesellschaft, Goettengen (DE)

( * ) Notice: Under 35 U.S.C. 154(b), the term of this patent shall be extended for 0 days.

(21) Appl. No.: 09/164,294

(22) Filed: Oct. 1, 1998

(30) Foreign Application Priority Data

Oct. 4, 1997 (DE) .............................. 197 43 835

(51) Int. Cl.$^7$ .......................... G01G 19/40; G01G 19/415
(52) U.S. Cl. ......................... 177/25.14; 702/173
(58) Field of Search ............... 177/25.13, 25.14; 705/410, 411, 415, 416; 702/173; 708/142, 143, 144, 145, 146

(56) References Cited

U.S. PATENT DOCUMENTS

| | | | |
|---|---|---|---|
| 4,244,020 | * 1/1981 | Ratcliff | 702/32 |
| 4,291,385 | * 9/1981 | Osborne et al. | 708/146 |
| 4,412,591 | * 11/1983 | Reichmuth et al. | 177/25.11 |
| 4,480,305 | * 10/1984 | Watson et al. | 364/200 |
| 4,481,587 | * 11/1984 | Daniels, Jr. | 705/407 |
| 4,507,743 | * 3/1985 | Haneda et al. | 364/709 |
| 4,575,804 | * 3/1986 | Ratcliff | 708/133 |
| 4,650,014 | 3/1987 | Oldendorf et al. | 177/177 |
| 4,656,600 | * 4/1987 | Swann | 702/173 |
| 4,727,502 | * 2/1988 | Katsura et al. | 364/706 |
| 4,814,995 | * 3/1989 | Daniels, Jr. | 177/25.13 |
| 4,840,239 | * 6/1989 | Slagg | 177/25.14 |
| 4,862,401 | * 8/1989 | Kubli et al. | 177/25.11 |
| 5,131,482 | * 7/1992 | Davis et al. | 177/25.14 |
| 5,377,130 | * 12/1994 | Frank et al. | 708/142 |
| 5,508,946 | * 4/1996 | Kawara et al. | 702/173 |
| 5,544,684 | * 8/1996 | Robinette, III | 141/83 |
| 5,589,670 | * 12/1996 | Berli | 177/25.13 |
| 5,724,245 | * 3/1998 | Maher et al. | 177/25.13 |
| 5,841,076 | * 11/1998 | Schwartz et al. | 177/25.13 |
| 5,905,232 | * 5/1999 | Schwartz et al. | 705/411 |

FOREIGN PATENT DOCUMENTS 35 40 749 A1   6/1986   (DE) .

* cited by examiner

*Primary Examiner*—Randy W. Gibson
(74) *Attorney, Agent, or Firm*—Sughrue, Mion, Zinn, Macpeak & Seas, PLLC

(57) ABSTRACT

A weighing instrument that incorporates a formula parsing engine and keys for entering a formula. One key is assigned for entering the current mass reading into the formula, based on which a calculated result is obtained and displayed. This result changes according to the entered formula for each weight that is placed on the weighing pan.

25 Claims, 4 Drawing Sheets

=0.3*W*W+17.3*W-28.2

11

=0.3*W*W+17.3*W-28.2

175.97 o

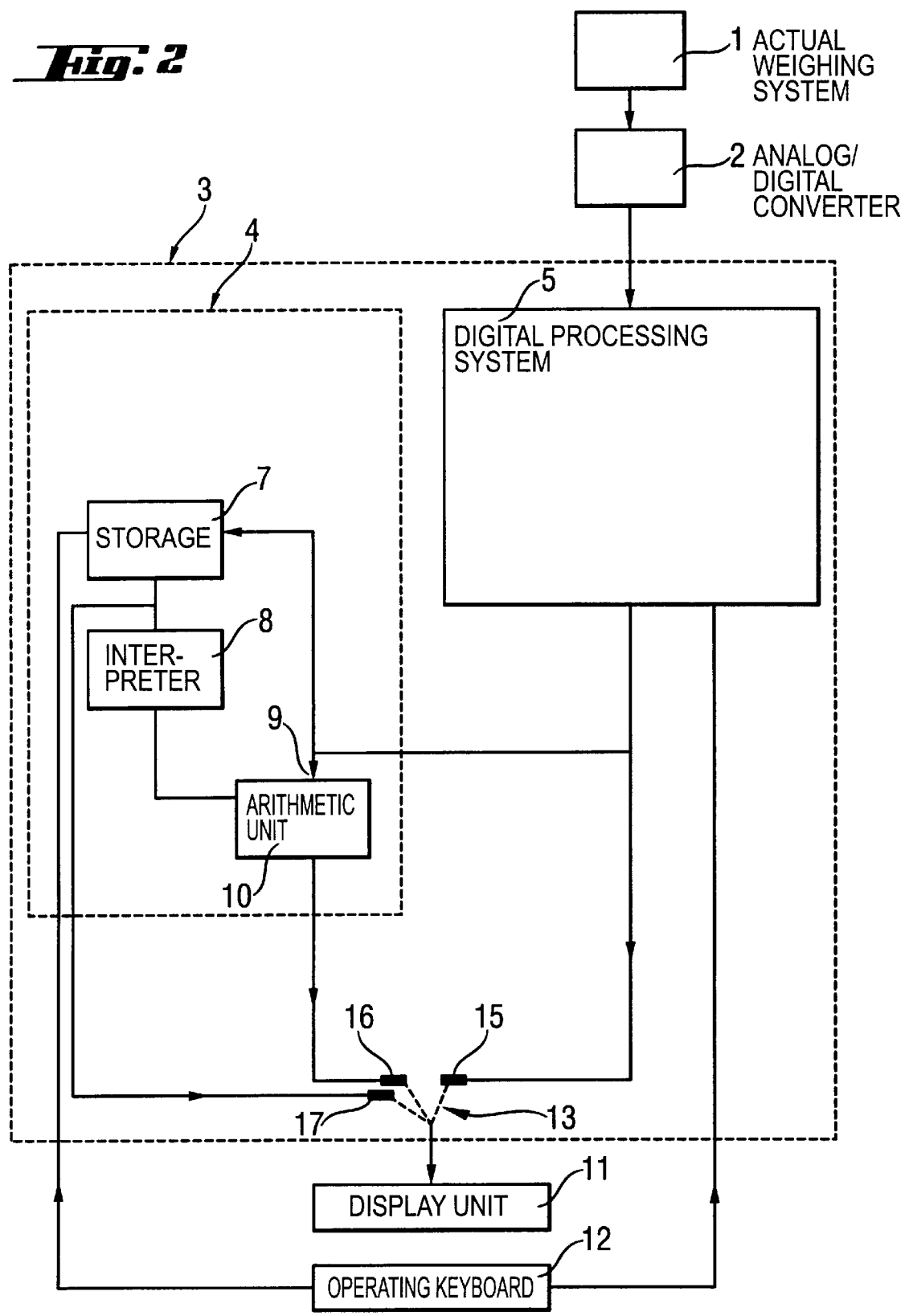

ELECTRONIC FORMULA PROCESSING SCALE

FIELD OF THE INVENTION

This invention relates to electronic scales. More particularly, this invention relates to electronic scales that are able to calculate and display a result from the mass of an object to be measured in accordance with a formula.

BACKGROUND OF THE INVENTION

Weighing instruments measure the mass of an object by measuring its weight. Electromagnetic force compensation scales are scales, in which the pan rests on a shaft above parallel guides, one of which extends beyond its fixed fulcrum to an electromagnet. The electromagnet exerts a force on its end of the guide, which acts as a lever. A sensor detects when the lever is up or down, that is, when the electromagnet's effect on the lever does not yet match the effect of the object to be weighed. The sensor feeds this information back to an amplifier which adjusts the coil current. When the lever is at a given null point, a processor uses the coil current to determine the weight.

Electronic scales with an incorporated keypad are known. They include an electronic balance or scale with a weighing pan or tray, a weighing system, a display, an operating keyboard, a 10-digit numbered keyboard for the entry of any given numerical data, and a digital electronic signal processing system or processor.

Electronic balances of this kind are generally known and described, for example, in German laid-open publication DE 35 40 749 A1.

The arithmetic capabilities of known balances are very limited. Known balances are able to subtract a tare value and to multiply certain values with a factor, for example for a percentile conversion, a conversion to other units of measurement (i.e., carat or mole) or a price calculation at balances of store counters. Furthermore, there are balances with fixed application programs, e.g., for the determination of density according to the buoyancy method, for the calculation of buoyance of air, or for the calculation of drying factors. However, these balances can only use a pre-programmed formula. Therefore, they can only be utilized for the respective purpose. If further arithmetic steps should be carried out, it is therefore customary to connect the balance via a data output to an external calculator to carry out the additional arithmetic steps. However, programming knowledge is required to incorporate the measured mass from the balance into the individual arithmetic program.

Therefore, it is one object of this invention to introduce a balance in the above mentioned form, which is able to convert the measured masses according to a wide variety of formulae without requiring programming knowledge of peripheral devices.

SUMMARY OF THE INVENTION

A weighing instrument that incorporates a formula parsing engine and keys for entering a formula. One key is assigned to enter the current mass reading into the formula, based on which a calculated result is obtained and displayed. This result changes according to the entered formula for each weight that is placed on the weighing pan.

BRIEF DESCRIPTION OF THE DRAWINGS

Preferred embodiments of this invention will be described in detail below in connection with the following drawings, in which like numbers refer to like objects. The drawings show:

FIG. 2 an electronically switched block diagram of the balance of FIG. 1;

DETAILED DESCRIPTION OF THE PREFERRED EMBODIMENT

According to the invention, the above and other objects are achieved by providing a balance with the keys for the entry of computation operators such as "addition", "subtraction", "multiplication", and "division" and by providing a key for the entry of a computation component "measured mass". The balance according to the invention also includes an interpreter. A programming mode can be activated, which allows for an entry of a formula by an operator. The formula will then be stored in a digital electronic signal processing system, received by the interpreter, and translated into arithmetic commands. The digital electronic signal processing system converts the measured mass according to the entered formula in a normal weighing mode, and the result of the conversion is displayed.

The entry of this formula in the programming mode can be performed in the same way as is known for calculators, whereby the measured mass issued by the balance is transferred into the formula through the use of the corresponding key "measured mass." This is done in the same way as for a calculator, where data is transferred from a storage to an ongoing calculation through the use of a "release data from storage" key. The interpreter, which is installed in the digital electronic signal processing system, translates the entered formula into commands for a microprocessor of the digital electronic signal processing system. These commands are converted in the normal weighing mode.

Figures 1, 3, 4:
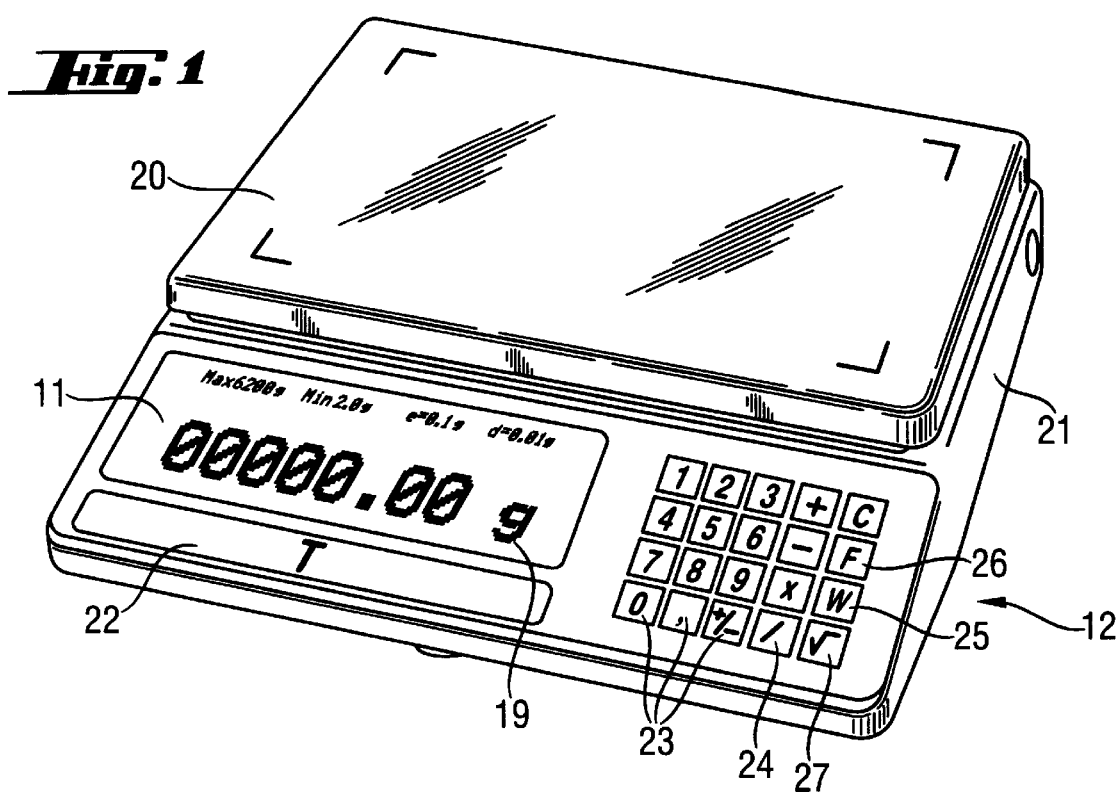
FIG. 1 a perspective view of the electronic balance with an operating keyboard and display.
FIG. 3 the display of the balance as seen in FIG. 1 in the programming mode after the entry of a formula.
FIG. 4 the display of the balance as seen in FIG. 1 in the weight mode with the display showing the formula result.

The perspective view of the balance in FIG. 1 shows a casing 21, a weighing pan 20, a display unit 11, and an operating keyboard 12. The operating keyboard 12 consists of a tare key 22 and other keys 23 through 27, which are explained below.

Electronics 3 of the balance are shown in the block diagram of FIG. 2. An actual weighing system 1 is schematically represented by a box. This weighing system is known and not essential for the invention. For example, the weighing system can operate according to the principle of electromagnetic force compensation. The weighing system 1 is connected to an analog/digital converter 2, which need, of course, not be used if the weighing system 1 has a digital output. The digital measured mass is delivered to a known digital signal processing system 5 to digitally filter and scale the display to a mass unit, for example grams "g". Through a three-way switch 13 in a switch position 15, the resulting measured mass is then forwarded to a display unit 11 and displayed together with a gram symbol "g", as is shown in FIG. 1 as reference numeral 19.

The electronics explained so far are conventional and therefore not explained in much greater detail.

The additional electronics according to the invention are described in FIG. 2 in the dot-lined framed area. It consists of an arithmetic unit 10, a storage 7 to store the entered formula (and additional formulae), possible constant factors, and measured masses, and an interpreter 8 of formulae, which converts the stored formula into instructions for the arithmetic unit 10.

Entry of a formula takes place in the programming mode, which may be activated by pressing the key F twice or once for a longer period of time, shown as reference numeral 26 in FIG. 1. The weight display with the g symbol in the display unit 11, as shown in FIG. 1, then vanishes. The formula may be entered through a 10-digit keyboard 23 and through the keys of column 24 for the computation operators. The measured mass is retrieved by pressing a key W, shown as reference numeral 25 in FIG. 1, and displayed on the display unit 11 as "W". When the balance is in the programming mode, the three-way switch 13 is in a position 17, and the entered formula components appear after their entry on the display unit 11. FIG. 3 shows an example of a formula entered in such a way as it is displayed on the display unit 11. This sample formula reads: The square of the measured mass is multiplied by 0.3, then 17.3 times the measured mass is added thereto, and 28.2 is subtracted therefrom. The completion of the formula entry is signaled by the operator by pressing the key F 26 on the keyboard 12. The complete formula is stored in the storage 7, which is immune to power failure. The stored formula is converted by the interpreter 8 into a sequence of commands for the arithmetic unit 10. The current measured mass present at an input 9 of the arithmetic unit 10 is then converted by the arithmetic unit according to the stored formula. The arithmetic result is continuously updated on the display unit 11. Therefore, the three-way switch 13 is automatically switched into a switch position 16.

As an example, the display of the calculated result is shown in FIG. 4. In this example, a measured mass of 10.05 g is assumed, which is converted, according to the formula in FIG. 3, into an arithmetic result of 175.97. To differentiate the measured mass from the arithmetic result, the measured mass is marked with the gram symbol "g" 19, whereas the arithmetic result is marked with a small circle 29. In addition, an illumination of the key F may show that it refers to an arithmetic result corresponding to the entered formula By pressing the key W (reference number 25 in FIG. 1), the three-way switch 13 switches to a position 15, and the display unit 11 shows the normal measured mass together with the gram symbol "g" 19. Optionally, an illumination of the key W may also indicate that the display refers to a normal measured mass. By pressing the keys F and W respectively, the switch 13 switches between the switch position 16 (and thus, the display of the arithmetic result) and the switch position 15 (and thus the display of the measured mass).

The number of displayed digits for the arithmetic result is selected such that, on the one hand, the rounding errors are still small. On the other hand, an accuracy significantly better than the measurement accuracy should not be displayed. One displayed digit more than the numbers of digits for the measured mass is therefore a good compromise for the number of decimals in the arithmetic result.

The display of the arithmetic result follows the change of the measured mass immediately. If no weight is on the balance (measured mass=0), for example, the arithmetic result displayed would be −28.20 according to the formula of FIG. 3. If the load of the balance were increased to 15.42 g, for example, the arithmetic result displayed would be 309.90.

Figure 5:
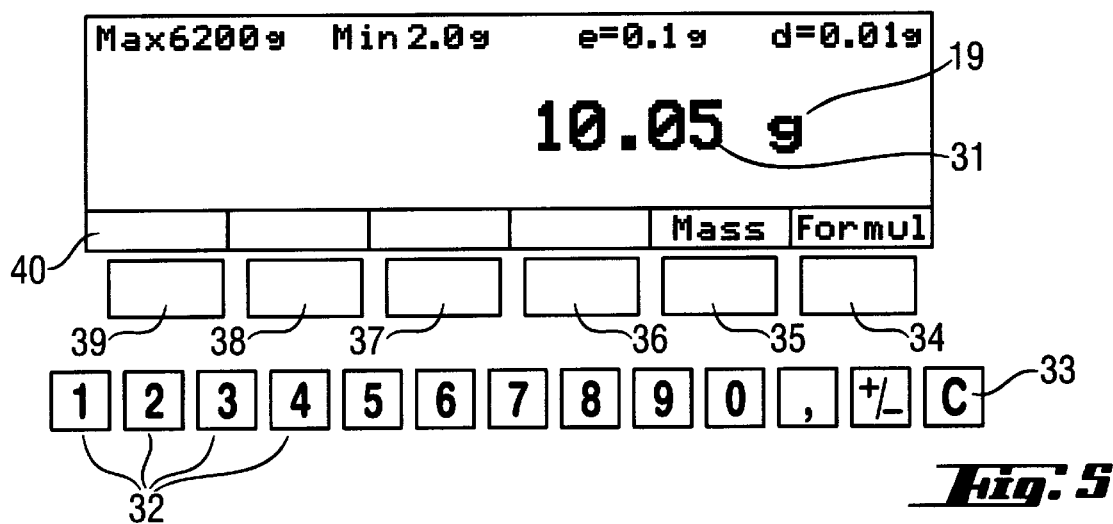
FIG. 5 the display and the operating keyboard of the balance in a second embodiment in the weight mode with the display showing the measured mass.
Figure 6:
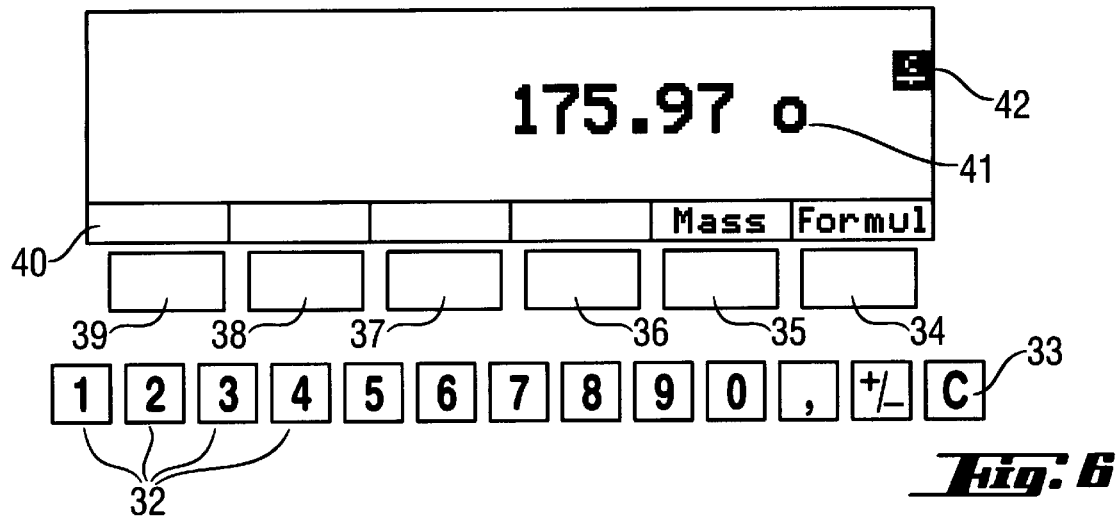
FIG. 6 the display and the operating keyboard of the balance in the second embodiment in the weight mode with the display showing the formula result.
Figure 7:
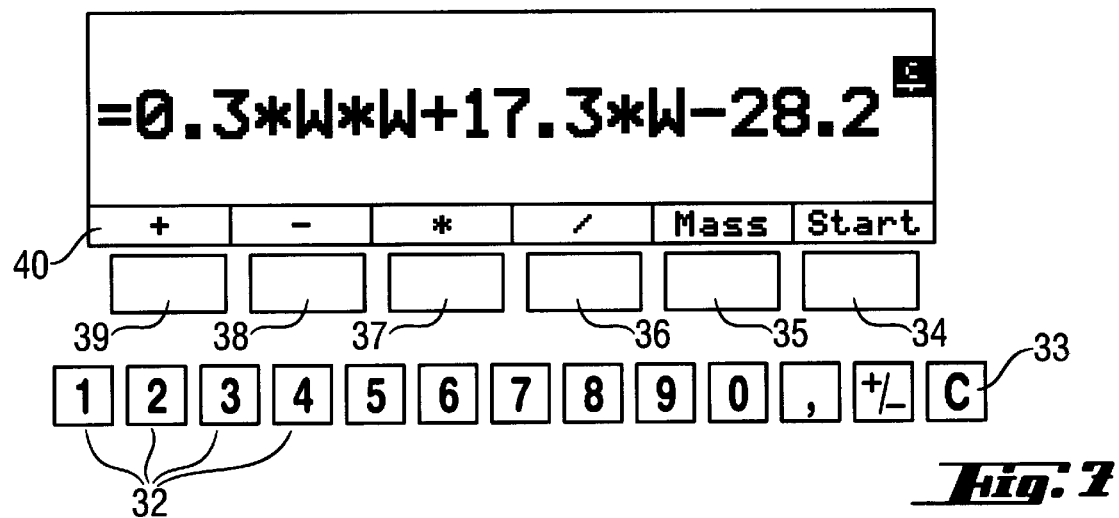
FIG. 7 the display and the operating keyboard of the balance in the second embodiment in the programming mode after the entry of a formula.

In FIGS. 5 through 7, an alternative embodiment for the display unit and the operating keyboard is shown. FIG. 5 shows the normal display of the measured mass 31 having a value of 10.05 g. At the same time, calibration data like maximum load Max, minimum load Min, calibration value e and digital precision d are displayed. The operating keyboard includes a 10-digit numbered keyboard 32 and an erasing key C 33 as well as six keys 34 through 39, which are unmarked themselves but marked by a lowest line 40 of the display. During the display of the measured mass, only the two keys 34 and 35 are active and marked. These keys correspond to the keys F and W in the first embodiment corresponding to FIG. 1 (the keys 36 through 39 may be marked and applied to other applications of the balance, for example counting, which is not shown in FIG. 5 for ease of overview). By pressing the key 34, the balance switches from the measured mass to the calculated result or the formula result according to a previously stored formula. The resulting display is shown in FIG. 6. A small circle will appear instead of the g-symbol, the calibration parameters will disappear, and the "c" symbol 42 (c=computed) will appear on the right side. Again, only the keys 34 and 35 of the keys 34 through 39 are active and marked.

By pressing the key 35, the balance switches back to the display of the measured mass according to FIG. 5. By pressing the key 34 for a long time or by pressing it twice, the programming-mode for the entry of the formula is activated. This, together with the previously entered formula, is shown in FIG. 7. In the programming-mode, the keys 36 through 39 are assigned to the four basic operations and the keys 35 transfers the measured mass into the formula. By pressing the key 34, the end of the formula is signaled and an automatic switching into the mode of displaying the arithmetic result is caused, as shown in FIG. 6. Further details of the embodiment according to FIGS. 5 through 7 correspond to the first embodiment according to FIG. 1 to 4.

Figures 8, 9:
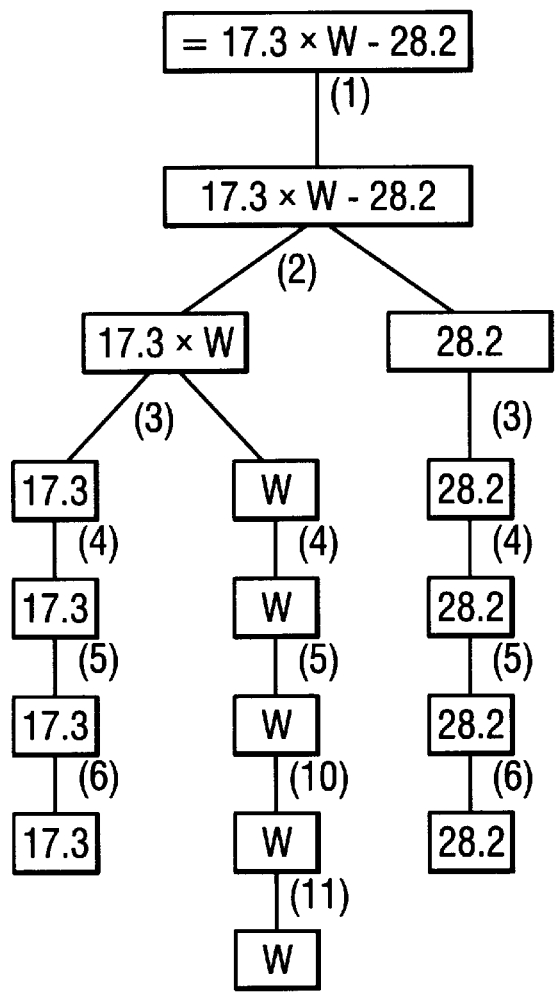
FIG. 8 the display of the balance in a third embodiment.
FIG. 9 an example schematic of the recursive conversion of a formula using the Backus-Naur method.

In FIG. 8, a third embodiment of the display of the balance is shown. In this embodiment, the currently measured mass is displayed in the upper portion 50, together with the gram symbol "g". Also, at the very top, the calibration parameters are depicted. In the lower portion 51, the current arithmetic result according to the entered formula is shown. Through the caption "result of formula", the current arithmetic result is clearly indicated so that the small circle of the other embodiments is not necessary. Through the simultaneous display of the measured mass and the result of the formula, switching between the two display options as in the other embodiments is not necessary. The display in the programming mode corresponds to the display of the other embodiments. If no formula is entered or if the balance is used only for weighing, the lower portion 51 of the display is turned off.

The above described embodiments of the balance can certainly be expanded by all the keys and functions that conventional calculators are known for: Keys for the entry of parenthesis, keys for the retrieval of predefined constant factors (for example: π), or keys for functions such as root sine, logarithm, exponential function, etc. In addition, keys to store numbers or measured masses and to retrieve the stored masses may be provided. The root function and the constant π are necessary, for example, when the diameter of a wire is to be calculated from the weight of a thin wire with a known length and a known specific weight. Through the ability to store measured masses, applications can be covered, wherein the result comes from two or more measured masses resulting at two different points in time, e.g., the measurement of density by weighing in air or in a liquid. All these known functions and options of calculators are so common that a graphic representation and a detailed specification has been left out; in FIG. 1, the key 27 is included as an example of the square root function.

It is also easily possible to configure the storage 7 large enough to store various formulae together with a code word under which these formulae may be retrieved and utilized for conversion of the measured masses.

The arithmetic details for the formulae that are understandable for the interpreter result from the following:

The formula may include the following operators:

|   |   |
|---|---|
| + | Addition |
| − | Subtraction |
| * | Multiplication |
| / | Division |

The formula may include the following computation components:

current, regularly updated measured mass
stored measured mass (n different)
constant (a number)
stored constants (n different) $K_n$
π (3.1415 . . .)
e (2.781 . . .)

The formula may include the following functions:

|   |   |
|---|---|
| sqrt | square root |
| sin | sine |
| cos | cosine |
| tan | tangent |
| abs | absolute value |
| log | logarithm to base 10 |
| ln | logarithm to base e, natural logarithm |
| Exp | exponential function |
| arcsin | arc sine |
| arccos | arc cosine |
| arctan | arc tangent |

The associative rule applies, which means that multiplication and division are performed before addition or subtraction. Formulae are parsed following the Backus-Naur method, which invokes the following rules:

| | |
|---|---|
| <Formula> ::== <Expression> | (1) |
| <Expression>::=<Product>{+<Product>\|−<Product>}* | (2) |
| <Product>::=<Pre-Factor>{*Pre-Factor/Pre-Factor}* | (3) |
| <Pre-Factor>::={+\|−}<Factor> | (4) |
| <Factor>::=(<Expression>)\|<Measured Mass>\| | |
| <Constant>\|π\|e\|<Function> | (5) |
| <Constant>::=numerical value\|<n$^{th}$ stored Constant> | (6) |
| <n$^{th}$ stored Constant>::=$K_n$ | (7) |
| <Function>::=<Function Name>(<Expression>) | (8) |
| <Function Name>::=sqrt\|sin51 cos\|tan\|abs\|log\|ln\|exp\|arcsin\|arccos\|arctan | (8) |
| <Measured Mass>::=<current measured mass, which changes in each weighing cycle>\|<n$^{th}$ stored measured mass> | (10) |
| <current measured mass, which changes in each weighing cycle>::=W | (11) |
| <n$^{th}$ stored measured mass upon pressing a key>::=$W_n$ | (12) |

The symbols above have the following meaning:

|   |   |
|---|---|
| ::= | consists of |
| { } | may include |
| { }* | may include any number of times from 0 to n |
| \| | or |

The interpreter recognizes the structure of the formulae by a recursive application of the Backus-Naur formula. This will be illustrated by the parsing of the second part of the formula of FIG. 3, which is '=17.3* W−28.2':

The interpreter takes the following steps, as shown in FIG. 9:

1. It compares the display contents with rule (1) and recognizes that '17.3 * W−28.2' must be an <expression>.
2. It compares '17.3 * W−28.2' with rule (2) an recognizes that '17.3 * W' and '28.2' must be <Products>.
3. It compares '17.3 * W' with rule (3) and recognizes that '17.3' and 'W' are <Pre-Factors>.
4. It compares '17.3' with rule (4) and decides that '17.3' is a <Factor>.
5. It compares '17.3' with rule (5) and recognizes that '17.3' is a <Constant>.
6. It compares '17.3' with rule (6) and recognizes that '17.3' is a numerical value.

As this point, this pass through the Back-Naur rules is completed. Rules 7 through 12 are not used in this case. The interpreter returns to the top within the convoluted rules and recognizes, using rules (4), (5), (10), and (11), the measured mass W. Then it returns to rule 2 and recognizes, in the same way, the last term of the formula.

Although the parser has been shown to be effective, other known recursive parsers as well as non-recursive parsers may be employed.

What is claimed is:
1. An electronic scale, comprising:
    a weighing system that determines a measured mass of an object that is received by the scale;

an electronic system including a digital processing system that calculates a formula result from the measured mass of the object according to a formula; and numerical value keys and mathematical operator keys to manually enter numerical values and mathematical operators of the formula into the electronic system.

2. The electronic scale as claimed in claim 1, further comprising a display unit that displays, simultaneously or selectively, the measured mass of the object and the formula result.

3. The electronic scale as claimed in claim 1, further comprising a first key that switches between a programming mode and a normal weighing mode of the scale, the programming mode permitting the manual entry of the formula into the electronic system.

4. The electronic scale as claimed in claim 3, wherein the electronic system comprises:

a storage that stores the formula;

an interpreter that receives the formula from the storage and converts the formula into arithmetic commands; and an arithmetic unit that receives the arithmetic commands from the interpreter and calculates, in the normal weighing mode of the scale, the formula result.

5. The electronic scale as claimed in claim 4, further comprising additional keys to insert parentheses, at least one predefined constant, and at least one function into the formula, to store at least one of a plurality of numbers and a plurality of measured masses in the storage, and to retrieve one of the plurality of measured masses from the storage.

6. The electronic scale as claimed in claim 5, wherein the at least one predefined constant comprises π, and wherein the at least one function is selected from the group consisting of root functions, sine functions, logarithm functions, and exponential functions.

7. The electronic scale as claimed in claim 4, wherein the storage is structured to store a plurality of formulae and wherein the interpreter and the arithmetic unit are structured to retrieve one of the plurality of formulae, in accordance with which the formula result is calculated from the measured mass.

8. The electronic scale as claimed in claim 4, wherein the interpreter is structured to interpret the formula recursively according to a Backus-Naur method.

9. The electronic scale as claimed in claim 3, further comprising a display unit and a second key that inserts, in the programming mode of the scale, the measured mass of the object into the formula.

10. The electronic scale as claimed in claim 9, wherein the first key is structured to cause, in the normal weighing mode, the display of the formula result on the display unit, and wherein the second key is structured to cause, in the normal weighing mode, the display of the measured mass on the display unit.

11. The electronic scale as claimed in claim 9, wherein, in the programming mode of the electronic scale, the display unit is structured to display the numerical values, the mathematical operators, and the measured mass during insertion into the formula.

12. The electronic scale as claimed in claim 9, wherein the first key, the second key and the mathematical operator keys are arranged at least partially adjacent to the display unit and captioned on a line of the display unit.

13. The electronic scale as claimed in claim 2, wherein the display unit comprises an area simultaneously displaying both the measured mass of the object and the formula result.

14. The electronic scale as claimed in claim 2, wherein the display unit is structured to display the measured mass of the object together with a mass unit symbol and the formula result without the mass unit symbol.

15. A method for calculating a formula result from a measured mass of an object received by an electronic scale, comprising:

determining the measured mass of the object with the scale;

manipulating keys corresponding to numerical values and keys corresponding to mathematical operators to manually enter a formula into an electronic system including a digital processing system of the scale; and in the electronic system, calculating the formula result from the measured mass according to the formula.

16. The method as claimed in claim 15, further comprising displaying selectively or simultaneously, the measured mass of the object and the formula result.

17. The method as claimed in claim 16, further comprising entering the measured mass into the formula.

18. The method as claimed in claim 17, wherein the numerical values, the mathematical operators, and the measured mass are displayed during insertion into the formula.

19. The method as claimed in claim 16, wherein the measured mass of the object is displayed together with a mass unit symbol, and the formula is displayed without the mass unit symbol.

20. The method as claimed in claim 16 wherein the formula result is constantly calculated and constantly displayed on the display unit.

21. The method as claimed in claim 15, further comprising switching between a programming mode and a normal weighing mode, the programming mode permitting manual entry of the formula into the electronic system.

22. The method as claimed in claim 21, further comprising:

storing the formula in a storage of the electronic system;

supplying the formula from the storage to an interpreter in the electronic system;

in the interpreter, converting the formula into arithmetic commands;

supplying the arithmetic commands to an arithmetic unit in the electronic system; and in the normal weighing mode, calculating the formula result in the arithmetic unit.

23. The method as claimed in claim 22, further comprising storing a plurality of formulae in the storage and retrieving one of the plurality of formulae in accordance with which the formula result is calculated from the measured mass.

24. The method as claimed in claim 22, further comprising:

inserting parentheses, at least one predefined constant, and at least one function into the formula;

storing at least one of a plurality of numbers and a plurality of measured masses in the storage; and retrieving one of the plurality of measured masses from the storage.

25. The method as claimed in claim 22, wherein, in the converting step, the formula is interpreted recursively according to a Backus-Naur method.

* * * * *